United States Patent
Chen et al.

(10) Patent No.: US 7,571,039 B2
(45) Date of Patent: Aug. 4, 2009

(54) VEHICLE YAW/ROLL STABILITY CONTROL WITH SEMI-ACTIVE SUSPENSION

(75) Inventors: Shih-Ken Chen, Troy, MI (US); Nikolai K. Moshchuk, Grosse Pointe, MI (US); Cheng-Foo Chen, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 91 days.

(21) Appl. No.: 11/463,052

(22) Filed: Aug. 8, 2006

(65) Prior Publication Data

US 2008/0040000 A1 Feb. 14, 2008

(51) Int. Cl.
*B60G 17/016* (2006.01)
*B60G 23/00* (2006.01)
*B62K 25/00* (2006.01)

(52) U.S. Cl. .............................. 701/38; 701/37; 701/41; 701/42; 701/48; 701/70; 701/69; 701/72; 701/91; 280/5.5; 280/5.501; 280/5.502; 280/5.504; 280/5.506; 280/5.507; 280/5.508; 280/5.51; 180/41; 180/297; 180/901; 180/408; 180/252; 180/253; 180/280; 180/282; 180/410; 180/423; 180/446

(58) Field of Classification Search .................. 701/37, 701/38, 41, 42, 48, 70, 69, 72, 91; 180/197, 180/408, 233, 252, 253, 280, 282, 410, 423, 180/446, 41; 280/5.5, 5.01, 5.02, 5.04, 5.06, 280/5.07, 5.08, 5.51
See application file for complete search history.

(56) References Cited

U.S. PATENT DOCUMENTS

| | | | | |
|---|---|---|---|---|
| 5,097,419 A | * | 3/1992 | Lizell | 701/37 |
| 5,231,583 A | * | 7/1993 | Lizell | 701/37 |
| 5,497,324 A | * | 3/1996 | Henry et al. | 701/37 |
| 6,035,251 A | * | 3/2000 | Hac et al. | 701/70 |
| 6,179,394 B1 | * | 1/2001 | Browalski et al. | 303/146 |
| 6,496,758 B2 | * | 12/2002 | Rhode et al. | 701/1 |
| 6,505,108 B2 | * | 1/2003 | Bodie et al. | 701/41 |
| 6,529,803 B2 | * | 3/2003 | Meyers et al. | 701/1 |
| 6,633,803 B1 | * | 10/2003 | Shal et al. | 701/37 |
| 6,799,092 B2 | * | 9/2004 | Lu et al. | 701/1 |
| 6,865,468 B2 | * | 3/2005 | Lin et al. | 701/70 |
| 2005/0209762 A1 | * | 9/2005 | Lu et al. | 701/70 |
| 2005/0222731 A1 | * | 10/2005 | Ghoneim | 701/41 |
| 2005/0236894 A1 | * | 10/2005 | Lu et al. | 303/139 |
| 2006/0074533 A1 | * | 4/2006 | Karaba et al. | 701/37 |
| 2006/0136107 A1 | * | 6/2006 | Kim et al. | 701/38 |
| 2006/0224286 A1 | * | 10/2006 | Izawa et al. | 701/37 |
| 2006/0224287 A1 | * | 10/2006 | Izawa et al. | 701/37 |

* cited by examiner

*Primary Examiner*—Khoi Tran
*Assistant Examiner*—Jorge O Peche
(74) *Attorney, Agent, or Firm*—John A. Miller; Miller IP Group, PLC (57) ABSTRACT

A rollover avoidance system for changing the damping characteristics of suspension dampers at each wheel of a vehicle so as to mitigate the potential for vehicle rollover. The system includes a plurality of vehicle parameter sensors for measuring vehicle parameters and providing vehicle parameter signals. The system also includes a controller for generating a damper suspension command signal for each damper using the vehicle parameter signals. The controller considers a roll control factor representing a rollover condition of the vehicle and a yaw stability control factor representing a yaw condition of the vehicle to set the damping of the dampers to mitigate the potential for vehicle rollover.

7 Claims, 5 Drawing Sheets

VEHICLE YAW/ROLL STABILITY CONTROL WITH SEMI-ACTIVE SUSPENSION

BACKGROUND OF THE INVENTION

1. Field of the Invention

This invention relates generally to a vehicle rollover avoidance system and, more particularly, to a vehicle rollover avoidance system that employs a roll control factor and a yaw rate stability control factor to control semi-active suspension dampers to mitigate the risk of vehicle rollover.

2. Discussion of the Related Art

It is known in the art to mitigate a potential vehicle rollover using differential braking control, rear-wheel steering control, front-wheel steering control, or any combination thereof. A vehicle rollover avoidance system may receive vehicle dynamics information from various sensors, such as yaw rate sensors, lateral acceleration sensors and roll rate sensors, to determine the proper amount of action to be taken to detect a potential vehicle rollover. A balance typically needs to be provided between estimating the vehicle roll motion and the vehicle yaw motion to provide the optimal vehicle response. Thus, it is usually necessary to detect certain vehicle conditions to provide the roll detection. To precisely identify vehicle roll stability conditions, it may be advantageous to know the vehicle's roll rate and roll angle because they are the most important states in vehicle roll dynamics.

Under normal driving conditions, drivers can direct the vehicle to the desired heading through the control of the steering wheel. When the vehicle is turning, there are actually three motions taking place with the vehicle. Particularly, a turning motion, or yaw, is occurring, as the vehicle body is turning around an imaginary access vertical to the ground through the so-called yaw-center of the vehicle. Also, there is subtle vehicle sliding laterally, sometimes in the direction of the turn and sometimes away from the turn, depending mainly on the vehicle speed. Further, a tilting motion or roll motion occurs as the vehicle's body is turning around an imaginary axis parallel to the ground through the so-called roll-axis of the vehicle.

Under normal vehicle maneuvering conditions, the tire/road contact surfaces can generate sufficient forces to sustain the desired vehicle motions, and drivers are accustomed with these motions as they occur. However, when the vehicle maneuver starts approaching limit-handling conditions, the tire/road contact surfaces can no longer sustain the desired yaw motion and side-slip motion, and the vehicle body will exhibit an increased roll motion. As a result, a discrepancy will build up between the vehicle's yaw rate and its desired yaw rate, and between the vehicle's side-slip velocity and its desired side-slip velocity. Further, if the roll motion becomes too large, the vehicle may roll over.

SUMMARY OF THE INVENTION

In accordance with the teachings of the present invention, a vehicle rollover avoidance system is disclosed that controls semi-active suspension dampers at each wheel of the vehicle in response to a vehicle yaw and roll condition so as to mitigate vehicle rollover potential. The system includes various sensors that measure vehicle parameters, such as a speed sensor, a roll rate sensor, a lateral acceleration sensor, a yaw rate sensor and a hand-wheel angle sensor. Using these measured values, the system calculates a yaw stability control factor and a roll stability indicator. The system also calculates a roll error signal between a desired roll stability indicator command for the suspension dampers and the calculated roll stability indicator. The system generates a closed-loop roll control factor based on the roll error signal and a gain signal that is based on the magnitude of the calculated roll stability indicator, where the gain signal is a function of the vehicle speed. The system adds the closed-loop roll control factor to an open-loop rollover control factor, where the open-loop roll control factor is a function of the vehicle lateral acceleration. The system determines whether the yaw stability control factor or the added roll control factor is larger, and determines a front to rear distribution of damping control commands based on a yaw rate error signal and whether the vehicle is in an understeer or oversteer condition. The system uses the front to rear distribution and the larger of the roll control factor and the yaw stability control factor to calculate the damper control signals applied to the dampers at each wheel of the vehicle.

Additional features of the present invention will become apparent from the following description and appended claims taken in conjunction with the accompanying drawings.

DETAILED DESCRIPTION OF THE EMBODIMENTS

The following discussion of the embodiments of the invention directed to a vehicle rollover avoidance system is merely exemplary in nature, and is in no way intended to limit the invention or its applications or uses.

Figure 1:
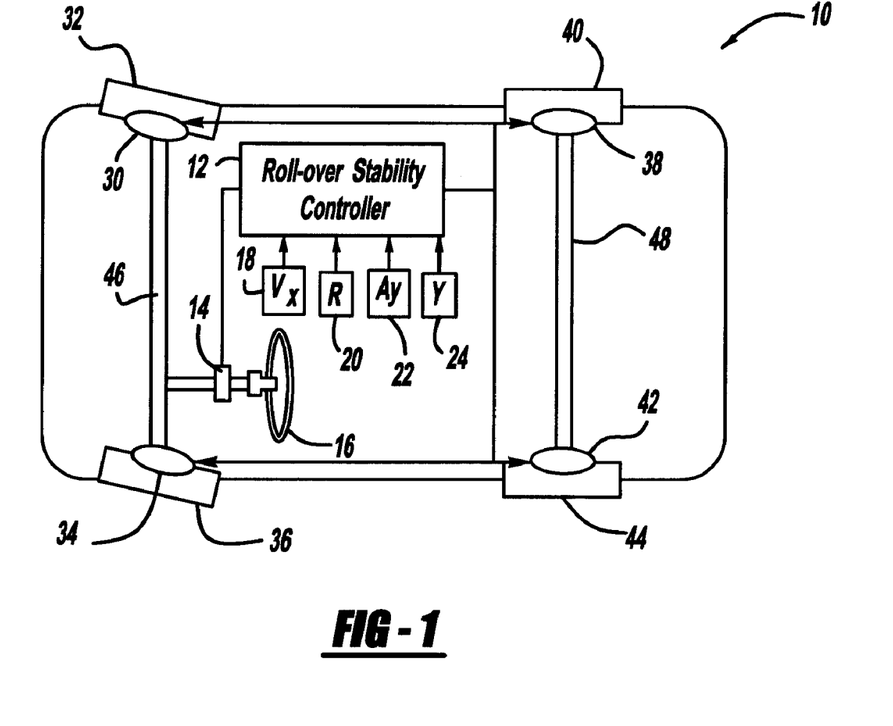
FIG. 1 is a schematic diagram of a vehicle including a vehicle rollover stability control system, according to an embodiment of the present invention.

FIG. 1 is a schematic plan view of a vehicle 10 including a rollover stability controller 12. The rollover stability controller 12 receives a hand-wheel angle signal from a hand-wheel angle sensor 14 indicative of the turning angle of a vehicle hand-wheel 16. Further, the controller 12 receives a vehicle speed signal $V_x$ from a speed sensor 18, a roll rate signal R from a roll rate sensor 20, a lateral acceleration sensor signal Ay from a lateral acceleration sensor 22 and a yaw rate signal Y from a yaw rate sensor 24. The vehicle 10 includes a magneto-rheological (MR) damper 30 at the right front tire 32, an MR damper 34 at the left front tire 36, an MR damper 38 at the right rear tire 40 and an MR damper 42 at the left rear tire 44. Passive MR dampers are well known in the vehicle suspension art that can be controlled to provide a desired ride for the vehicle.

The present invention proposes using semi-active MR dampers to change the stiffness of the damper in response to a potential rollover condition. As will be discussed in detail below, the rollover stability controller 12 provides a signal to the dampers 30, 34, 38 and 42 when the vehicle 10 is turning if a potential rollover condition occurs. Particularly, when suspension control is implemented for yaw rate stability control, the controller 12 commands the dampers 30, 34, 38 and 42 to redistribute the vehicle normal forces to create a lateral force difference across the vehicle axles 46 and 48. The difference of the lateral forces at the two ends of the axles 46 and 48 creates the desired yaw moment to stabilize the vehicle 10 when it is undergoing a limit-handling condition. By achieving the desired yaw moment, the vehicle 10 could increase its roll motion. In other words, yaw and roll motions are coupled and need to be balanced in order to achieve both yaw and roll stability.

Figure 2:
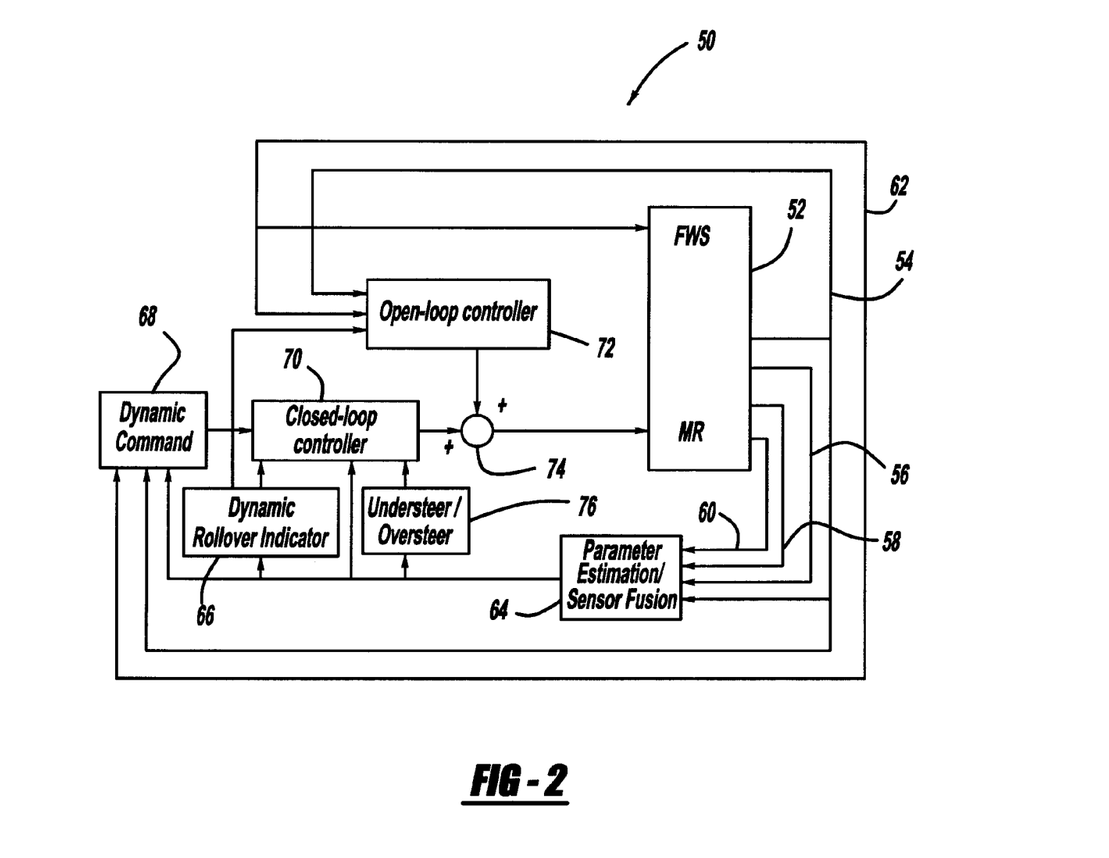
FIG. 2 is a schematic block diagram of the rollover stability control system of the invention.

FIG. 2 is a schematic block diagram of a roll stability control system 50, according to an embodiment of the present invention. The control system 50 includes a vehicle 52 that is being controlled. The speed signal $V_x$ from the sensor 18 is provided on line 54, the roll-rate signal R from the roll rate sensor 20 is provided on line 56, the lateral acceleration signal Ay from the lateral acceleration sensor 22 is provided on line 58, the yaw rate signal Y from the yaw rate sensor 24 is provided on the line 60 and the hand-wheel signal from the hand-wheel sensor 14 is provided on line 62.

The system 50 includes a parameter estimation/sensor fusion processor 64 that receives the speed signal $V_x$, the roll rate signal R, the lateral acceleration signal Ay and the yaw rate signal Y. The processor 64 uses these measurements of vehicle states to estimate other vehicle states used in the stability control. For example, the processor 64 may generate estimates of vehicle roll angle, vehicle side-slip angle, vehicle center of gravity height, etc. Processors that perform these operations based on the measured state signals are well known to those skilled in the art.

The estimated vehicle state signals from the processor 64 are applied to a dynamic rollover indicator processor 66. The processor 66 employs a roll stability indicator algorithm that determines whether the vehicle 52 is in a potential rollover condition. Various systems are known in the art to provide an index or indicator of a potential vehicle rollover condition. For example, U.S. patent application Ser. No. 11/330,640, filed Jan. 12, 2006, titled Vehicle Rollover Indicator for Vehicle Rollover Control, assigned to the Assignee of this application, and herein incorporated by reference, discloses one suitable process for providing a roll stability indicator.

The estimate vehicle state signals from the processor 64 are applied to an understeer/oversteer processor 76. The understeer/oversteer processor 76 calculates an understeer or oversteer condition of the vehicle 52 for reasons that will become apparent in the discussion below. Those skilled in the art will readily recognize various systems that are known that calculate vehicle understeer and oversteer.

The system 50 also includes a dynamic command processor 68 that receives the hand-wheel angle signal, the speed signal $V_x$ and the state estimations from the processor 64. The dynamic command processor 68 generates a command signal for the desired yaw rate of the vehicle 52. Any suitable dynamic command processor can be employed for this purpose, such as the command interpreter described in U.S. Pat. No. 6,865,468, titled Method and Apparatus for Vehicle Stability Enhancement System, assigned to the Assignee of this application and herein incorporated by reference.

The dynamic command signal, the roll stability indicator, the understeer/oversteer condition and the estimations from the processor 64 are applied to a close-loop controller 70. As will be discussed in detail below, the closed-loop controller 70 provides a closed-loop roll control factor that sets the stiffness of the dampers 30, 34, 38 and 42 based on the actual yaw and roll measurements of the vehicle 52 and the desired yaw and roll motion of the vehicle 52. The controller 70 determines a distribution of the damping control commands between the front and rear axles 46 and 48. As will be discussed in more detail below, the front to rear distribution between the axles 46 and 48 is based on a yaw rate error signal and whether the vehicle 52 is in an understeer or oversteer condition. The controller 70 can use look-up tables to determine the distribution based on these factors.

An open-loop controller 72 receives the roll stability indicator from the processor 66, the vehicle speed signal $V_x$ and the hand-wheel angle signal to provide an open-loop roll control factor for the stiffness of the dampers 30, 34, 38 and 42. The open-loop roll control factor and the closed-loop roll control factor are added by an adder 74 and are used to control the stiffness of the dampers 30, 34, 38 and 42.

The following is a discussion of the theory for calculating the closed-loop roll control factor based on vehicle dynamics, according to the invention. During cornering, the lateral load transfer unloads the inside wheels of the vehicle and increases the load on the outside wheels of the vehicle. The distribution between the outside and inside tires depends on the suspension characteristics, such as vehicle roll-stiffness, roll-damping, roll axis orientation, etc. Significant pitch motion affects the front and rear axle loads. In general, the tire lateral force $F_y$ is a complicated non-linear function of normal force, lateral/longitudinal slip, vehicle speed, etc.

In the calculations below, it is assumed that the tire lateral force $F_y$ is only a function of lateral slip and normal force as:

$$F_y = a(f_z)\sin(b(f_z)\tanh(c(f_z)\alpha)) \tag{1}$$

where $\alpha$ is the lateral slip, and $a(f_z)$, $b(f_z)$, $c(f_z)$ are polynomials (up to $6^{th}$ degree) of $f_z = F_z/F_{z0}$ as defined in the following equations.

$$a(f_z) = 4451.85 f_z - 66.92 f_z^2 + 104.44 f_z^3 - 192.09 f_z^4 + 58.86 f_z^5 - 5.24 f_z^6 \tag{2}$$

$$b(f_z) = 2.75 - 3.20 f_z + 4.291 f_z^2 - 2.44 f_z^3 + 0.67 f_z^4 - 0.09 f_z^5 + 0.004 f_z^6 \tag{3}$$

$$c(f_z) = 0.08 + 0.18 f_z - 0.25 f_z^2 + 0.15 f_z^3 - 0.04 f_z^4 + 0.006 f_z^5 - 0.00033 f_z^6 \tag{4}$$

In these equations, $F_z$ is the tire normal load and $F_{z0}$ is the tire nominal load. Coefficients of such polynomials can be determined from tire test data using some fitting procedures.

Alternatively, the tire lateral force $F_y$ can be defined by a three-dimensional table.

A tire lateral load transfer (TLLT) function for the front of the vehicle is defined as:

$$TLLT_{Fr} = \frac{\Delta F_{zFr}}{F_{zFr}} \tag{5}$$

$$\Delta F_{zFr} = F_{zL} - F_{zR} \tag{6}$$

$$F_{zFr} = F_{zL} + F_{zR} \tag{7}$$

where $F_{zL}$ is left front tire load, $F_{zR}$ is the right front tire load, and $F_{zFr}$ is the front total load. The TLLT for the rear of the vehicle is defined in the same manner.

The TLLT causes a reduction of the lateral force by:

$$\Delta F_y = 2F_y\left(\frac{F_{zL} + F_{zR}}{2}, \alpha\right) - F_y(F_{zL}, \alpha) - Fy(F_{zR}, \alpha) \quad (8)$$

The following semi-active suspension magneto-rheological damper (MRD) model is adopted here as:

$$F_{MDR}(V, I) = \sum_{n=1}^{7} (\xi_{0n} + \xi_{1n}I)V^n \quad (9)$$

where I is current, V is damper velocity, and $\xi_{1n}$ are constants. The following equation shows an example of this model.

$$F_{MRD}(V, I) = (1931.98 + 852.55I)V +$$
$$(81.57 - 224.63I)V^2 + (-1327.95 - 451.44I)V^3 +$$
$$(-91.42 + 112.95I)V^4 + (563.94 + 206.03I)V^5 +$$
$$(21.76 - 21.10I)V^6 + (-82.27 - 31.88I)V^7 \quad (10)$$

The front roll moment due to MRD forces is defined as:

$$M_{Fr} = [F_{MRD}(V_{LF}, I_{LF}) - F_{MRD}(V_{RF}, I_{RF})]\frac{T_{Fr}}{2} \quad (11)$$

where $T_{Fr}$ is the front track, LF is the left front and RF is the right front.

Damper velocity can be directly measured or related to sprung mass roll velocity as:

$$V_{RF} = -V_{LF} = \dot{\phi}\rho T_{Fr}/2 \quad (12)$$

where $\dot{\phi}$ is roll velocity and $\rho$ is the front shock lever ratio. The rear roll moment is defined in the same manner.

By knowing the roll angle $\phi$ and the roll velocity $\dot{\phi}$, the TLLT for the front and rear can be determined as:

$$TLLT_{Fr} = \frac{1}{T_{Fr}/2}\left(\frac{-K_{Fr}\varphi + M_{Fr}}{F_{zFr}} + h\varphi\right) \quad (13)$$

$$TLLT_{Rr} = \frac{1}{T_{Rr}/2}\left(\frac{-K_{Rr}\varphi + M_{Rr}}{F_{zFr}} + h\varphi\right) \quad (14)$$

where $K_{Fr}$ and $K_{Rr}$ are the front and rear roll stiffness and h is the sprung mass center of gravity height above the roll axis.

The yaw moment due to lateral load transfer is:

$$\Delta M_{yaw} = a\Delta F_y^{Fr} - b\Delta F_y^{Rr} \quad (15)$$

where a and b are longitudinal distances between the vehicle center of gravity (CG) and the front and rear axles, respectively.

In general, $\Delta M_{yaw}$ depends on the front and rear TLLT, slip angle, roll angle, roll velocity or damper velocities, and the amount of current at each damper. For given vehicle states, the MRD control capacity U is the maximum achievable yaw moment:

$$U = \Delta M_{yaw}(I_{Fr}=0, I_{Rr}=\max) - \Delta M_{yaw}(I_{Fr}=\max, I_{Rr}=0) \quad (16)$$

In other words, the MRD control capacity U is the maximum oversteer moment minus the maximum understeer moment. It is also a function of the TLLT, slip angle, roll angle, roll velocity or damper velocities. In order to better visualize the MRD control capacity U, assume that the slip angle is a function of lateral acceleration $A_y$ only, and such functions are determined from a steady-state cornering.

Neglecting roll inertia effect, roll angle can be derived from:

$$\varphi = \frac{M_S h a_y + M_{Fr} + M_{Rr}}{K_{Fr} + K_{Rr} - M_S g h} \quad (17)$$

where $M_S$ is the sprung mass.

Note that the tire slip angles can be estimated using available sensor information. U.S. Pat. No. 6,035,251, titled Brake System Control Method Employing Yaw Rate and Slip Angle Control, issued Mar. 7, 2000 to Hac et al., assigned to the Assignee of this application and herein incorporated by reference, shows one example of how to estimate this information. The vehicle state variables $\phi$ and $\dot{\phi}$ can be measured and/or estimated using other vehicle sensor information. By way of example, U.S. Pat. No. 6,179,394, titled Active Brake Balance Control Method, issued Jan. 30, 2001 to Browalski et al, assigned to the Assignee of this application and herein incorporated by reference, shows one example of how this information can be estimated through combined sensor inputs.

With proper distribution between the front and rear damper control currents, the desired yaw moment can be obtained through both feed-forward and feedback controls. The vehicle yaw moment can thus be controlled by changing the damping at each axle 46 and 48. For example, if the vehicle is in an oversteer condition, the suspension controller can increase the front axle damping while reducing the rear axle damping to correct the problem.

The roll moment can also be controlled through similar suspension control using the equation:

$$\Delta M_{roll} = \Delta F_{zFr}\frac{T_{Fr}}{2} + \Delta F_{zFr}\frac{T_{Rr}}{2} \quad (18)$$

The total roll moment is simply the sum of the roll moment from each axle 46 and 48. Therefore, after the desired total roll moment is determined, proper distribution between the control of the front and rear axles 46 and 48 can be provided to achieve the proper yaw control without adversely affecting the roll moment control performance.

The rollover control algorithm of the invention characterizes the vehicle understeer/oversteer behavior by checking vehicle information, such as yaw rate, lateral acceleration, vehicle speed and steering angle. Based on this information and by calculating a yaw rate error and a side-slip error, a yaw stability control factor $K_Y$ can be calculated as a magnitude and direction. One procedure for providing yaw stability control using semi-active suspension is disclosed in U.S. Patent Publication No. 2006/0074533 to Karaba et al., filed Sep. 20, 2005, titled Method and Apparatus for Controlling Semi- Active Suspension Components, which is assigned to the Assignee of the present invention and herein incorporated by reference. After the yaw stability control factor $K_Y$ is calculated, the algorithm then determines the roll stability indicator (RSI) based on the roll rate measurement and roll angle estimation. If this value exceeds a predetermined threshold, which indicates a single wheel lift condition, a rollover control algorithm is implemented. Otherwise, no rollover avoidance is needed.

Figure 3:
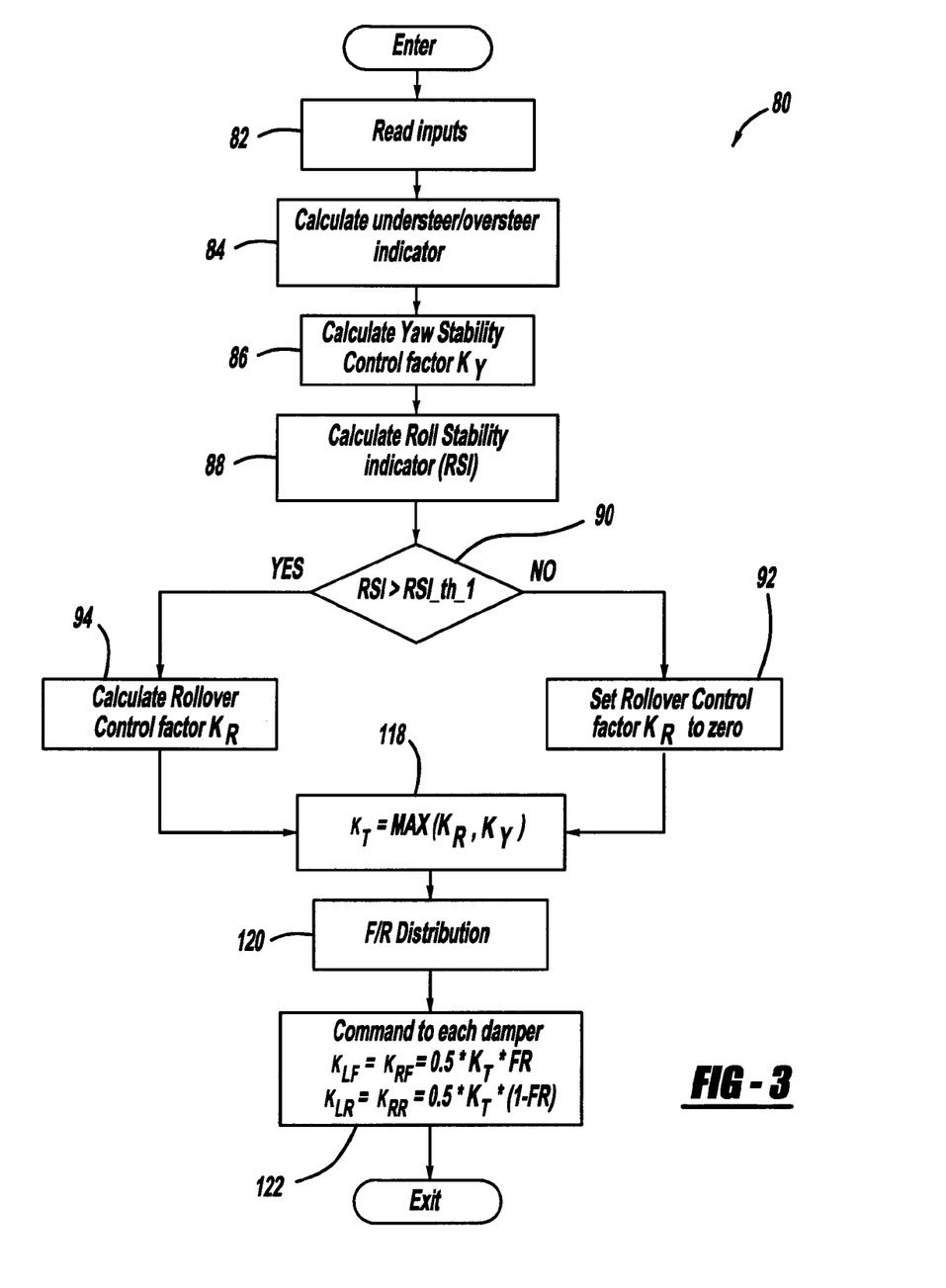
FIG. 3 is a flow chart diagram showing a process for providing damper commands to the vehicle suspension system to provide rollover mitigation, according to an embodiment of the present invention.

FIG. 3 is a flow chart diagram 80 showing a process for providing rollover avoidance using the yaw stability control factor $K_Y$ and the roll stability indicator as discussed above, according to an embodiment of the present invention. The algorithm first reads the sensor inputs at box 82 including the vehicle speed signal $V_x$, the roll rate signal R, the lateral acceleration signal $A_y$, the yaw rate signal Y and the handwheel angle signal. The algorithm then calculates an understeer or oversteer indicator at box 84. The understeer and oversteer indicator can be calculated by any suitable technique known in the art, such as the one disclosed in U.S. Patent Application Publication 2005/0222731 to Ghoneim, titled Method and Apparatus for Estimating Steering Behavior for Integrated Chassis Control, published Oct. 6, 2005, assigned to the assignee of this application and herein incorporated by reference.

The algorithm then calculates the yaw stability control factor $K_Y$ at box 86, and the roll stability indicator at box 88. The algorithm then determines whether the roll stability indicator is greater than a first threshold RSI_th_1 at decision diamond 90. If the roll stability indicator is less than the first threshold RSI_th_1, then the vehicle 52 does not need rollover control and a roll control factor $K_R$ is set to zero at box 92. If, however, the roll stability indicator is greater than the first threshold RSI_th_1 at the decision diamond 90, then the algorithm calculates the roll control factor $K_R$ at box 94.

Figure 4:
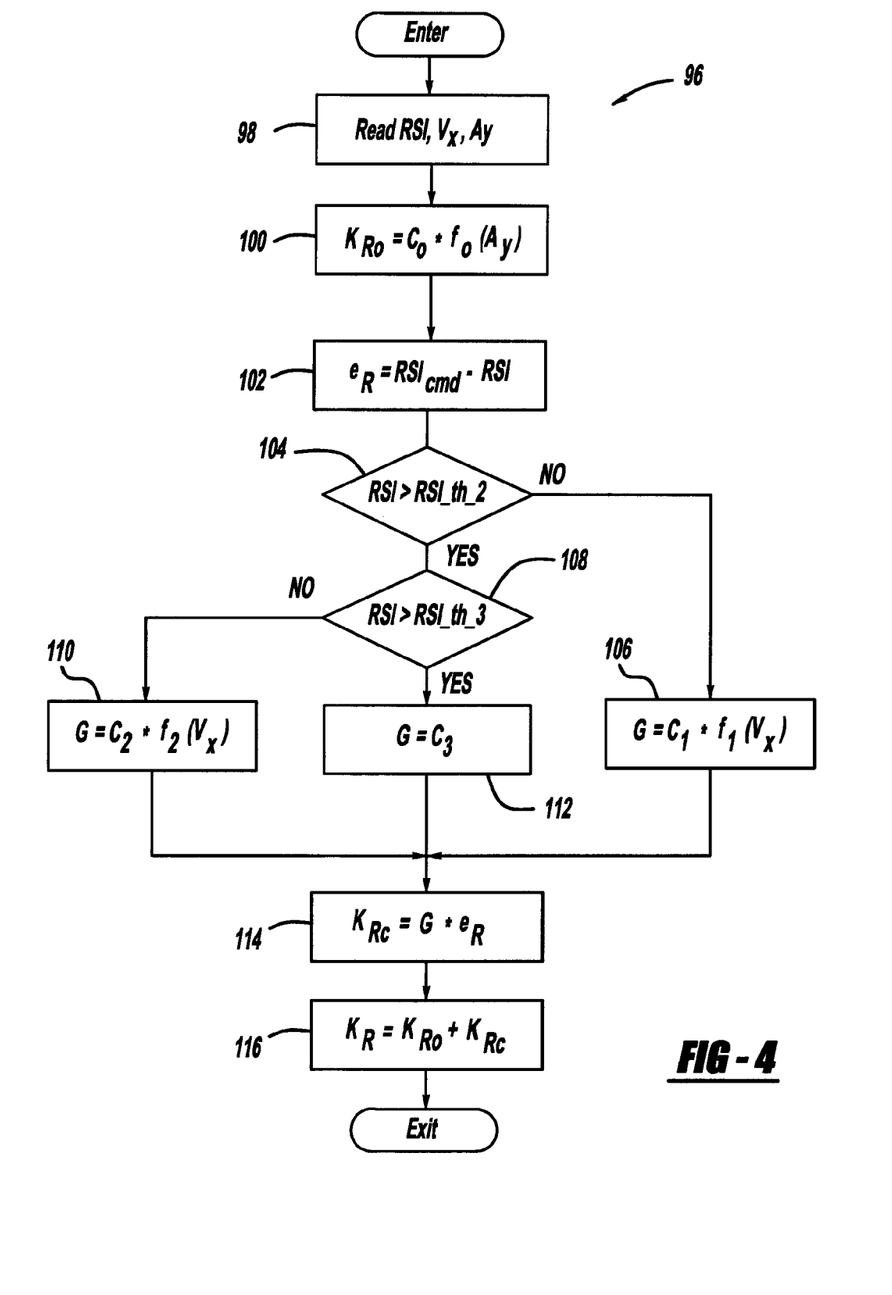
FIG. 4 is a flow chart diagram showing a process for determining a roll control factor value in the process of FIG. 3.
Figure 5:
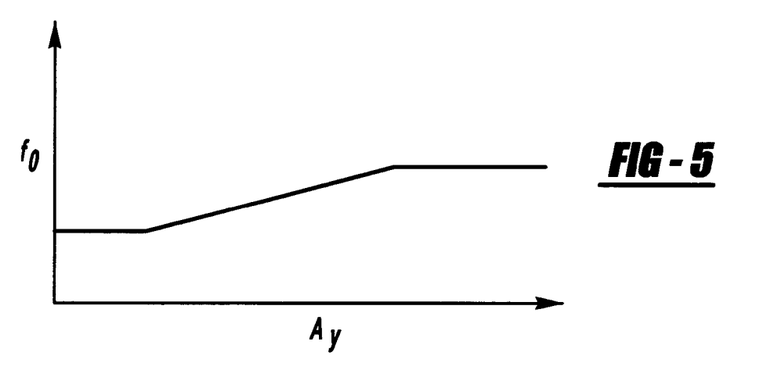
FIG. 5 is a graph with lateral acceleration on the horizontal axis and damper feed-forward control on the vertical axis for determining a feed-forward control factor based on vehicle lateral acceleration.

FIG. 4 is a flow chart diagram 96 showing a process for calculating the rollover control factor $K_R$, according to an embodiment of the present invention. The algorithm reads the roll stability indicator, the vehicle lateral acceleration signal Ay at box 98. The roll control factor $K_R$ consists of both a feed-forward factor $K_{Ro}$ (open-loop) and a feedback factor $K_{Rc}$ (closed-loop) control. The algorithm calculates the feed-forward factor $K_{Ro}$ at box 100 by the equation:

$$K_{Ro}=C_o f_o(Ay) \quad (19)$$

Where $C_o$ is a constant and $f_o$ is a non-linear function of vehicle speed. FIG. 5 is a graph with lateral acceleration Ay on the horizontal axis and the function $f_0$ on the vertical axis showing how the function $f_0$ changes as lateral acceleration changes.

Figure 6:
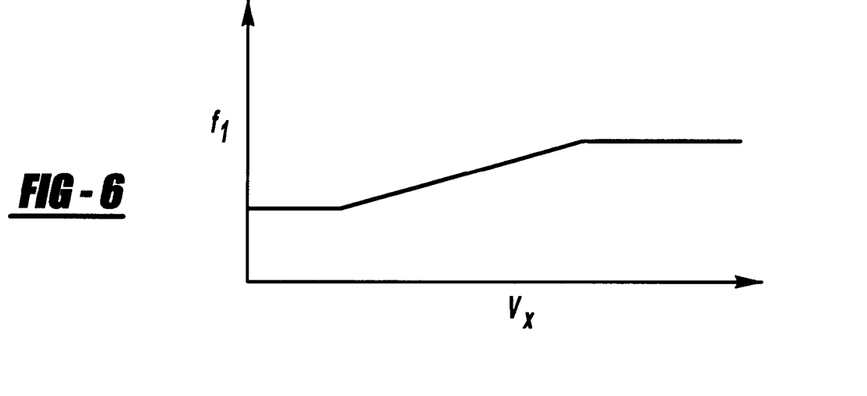
FIG. 6 is a graph with vehicle speed on the horizontal axis and a gain function on the vertical axis for determining the gain function based on vehicle speed for a low roll stability indicator.

The algorithm then calculates a roll error signal $e_R$ as the difference between the desired roll stability indicator command signal from the processor 68 and the roll stability indicator from the processor 66 at box 102. The algorithm then determines whether the roll stability indicator is greater than a second threshold RSI_th_2 at decision diamond 104. If the roll stability indicator is less than the second threshold RSI_th_2, meaning that the rollover condition is low, then the algorithm calculates a damper control gain G at box 106 as:

$$G=C_{1f1}(V_x) \quad (20)$$

where $C_1$ is a constant and $f_1$ is a non-linear function of vehicle speed. FIG. 6 is a graph with vehicle speed $V_x$ on the horizontal axis and the function $f_1$ on the vertical axis showing how the function $f_1$ changes as the vehicle speed increases.

Figure 7:
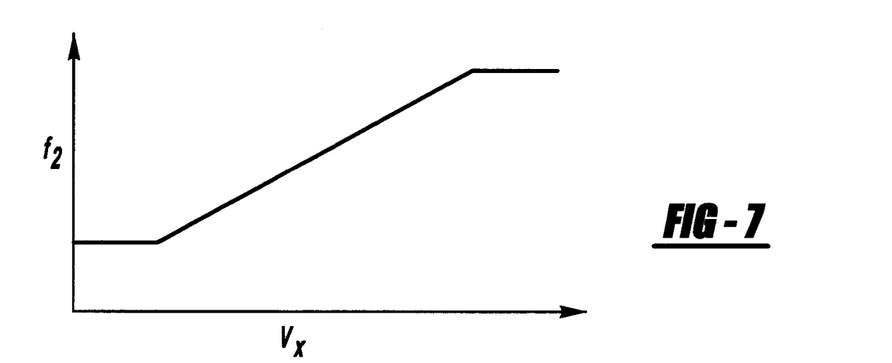
FIG. 7 is a graph with vehicle speed on the horizontal axis and a gain function on the vertical axis for determining the gain function based on vehicle speed for a medium roll stability indicator.

If the roll stability indicator is greater than the second threshold RSI_th_2 at the decision diamond 104, then the algorithm determines whether the roll stability indicator is greater than a third threshold RSI_th_3 at decision diamond 108. If the roll stability indicator is not greater than the third threshold RSI_th_3 at the decision diamond 108, then the algorithm calculates the damper control gain G at box 110 as:

$$G=C_{2f2}(V_x) \quad (21)$$

where $C_2$ is a constant and $f_2$ is a non-linear function of vehicle speed. FIG. 7 is a graph with vehicle speed on the horizontal axis and the function $f_2$ on the vertical axis showing how the function $f_2$ changes as the vehicle speed increases.

When the RSI value exceeds the third threshold RSI_th_3 at the decision diamond 108, it indicates that the vehicle is in imminent risk of rolling over. In this case, the control gain G for all wheels is set to the maximum allowed at box 112 as:

$$G=C_3 \quad (22)$$

The closed-loop roll control factor $K_{Rc}$ is then calculated at box 114 based on the following equation:

$$K_{Rc}=Ge_R \quad (23)$$

Where $e_R$ is the computed error between the desired RSI value and the actual RSI value.

The total roll control factor is the sum of the feed-forward and feedback factors at box 116.

$$K_R=K_{Ro}+K_{Rc} \quad (24)$$

Returning to FIG. 3, the algorithm then determines which of the yaw stability control factor $K_Y$ or the roll stability control factor $K_R$ is larger at box 118, and sets either the yaw stability control factor $K_Y$ or the roll control factor $K_R$ equal to a total control factor $K_T$.

$$K_T=MAX(K_Y,K_R) \quad (25)$$

The next step of the control algorithm is to determine the distribution of the damping control command between the front and rear axles 46 and 48 at box 120. The front/rear (F/R) axle distribution is based on the degree of deviation of vehicle yaw response from the desired yaw command and the vehicle understeer/oversteer behavior. As the yaw rate error increases, the distribution ratio between the front and rear axles 46 and 48 goes from a more stiff rear axle to a more stiff front axle. Table I below is an example of the F/R distribution when the vehicle exhibits an understeer condition, and Table II is an example of the F/R distribution when the vehicle exhibits an oversteer condition where the distribution is the opposite for the understeer condition.

TABLE I

| | Yaw rate error | | | | |
|---|---|---|---|---|---|
| | −10 | −5 | 0 | 5 | 10 |
| F/R Ratio (FR) | 0 | 0.25 | 0.5 | 0.75 | 1.0 |

TABLE II

| | Yaw rate error | | | | |
|---|---|---|---|---|---|
| | −10 | −5 | 0 | 5 | 10 |
| F/R Ratio (FR) | 1.0 | 0.75 | 0.5 | 0.25 | 0 |

Once the front to rear distribution is determined, then the algorithm determines the damping command signal for the dampers 30, 34, 38 and 42 at box 122 by the following equations, where $K_{LF}$ is the damping command signal for the damper 34, $K_{RF}$ is the damping command signal for the damper 30, $K_{LR}$ is the damping command signal for the damper 42 and $K_{RR}$ is the damping command signal for the damper 38.

$$K_{LF}=0.5K_T FR \tag{26}$$

$$K_{RF}=K_{LF} \tag{27}$$

$$K_{LR}=0.5K_T(1-FR) \tag{28}$$

$$K_{RR}=K_{LR} \tag{29}$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A rollover avoidance system for changing the damping characteristics of suspension dampers at each wheel of a vehicle to mitigate a potential rollover condition, said system comprising:
    a speed sensor providing a vehicle parameter speed signal of the speed of the vehicle;
    a roll rate sensor providing a vehicle parameter roll rate signal of the roll rate of the vehicle;
    a lateral acceleration sensor for providing a vehicle parameter lateral acceleration signal of a lateral acceleration of the vehicle;
    a yaw rate sensor for providing a vehicle parameter yaw rate signal of the yaw rate of the vehicle;
    a hand-wheel angle sensor for providing a vehicle parameter hand-wheel angle signal of the angle of a vehicle hand-wheel;
    a rollover indicator processor for calculating a roll stability indicator signal;
    a dynamic command processor for generating a desired stability command signal based on the vehicle parameter signals for a desired stiffness of the dampers; and
    a closed-loop controller responsive to vehicle parameter signals, the calculated roll stability indicator signal and the desired stability command signal, said closed-loop controller calculating an understeer or oversteer signal based on whether the vehicle is in an understeer or oversteer condition and a yaw stability control factor based on a yaw rate error signal and a side-slip error signal, said closed-loop controller further determining a roll error signal as the difference between the desired stability command signal and the calculated rollover stability indicator signal, said closed-loop controller also calculating a gain signal as a function of the vehicle speed signal, said closed-loop controller further calculating a closed-loop roll control factor based on the gain signal and the roll error signal, said closed-loop controller also determining a front to rear damper distribution of the damping characteristics of the suspension dampers based on the yaw rate error signal and the understeer or oversteer signal, said closed-loop controller generating a damper suspension command signal for each damper based on the front to rear distribution signal and the closed-loop roll control factor or the yaw stability control factor.

2. The system according to claim 1 wherein the closed-loop controller uses the yaw stability control factor or the roll control factor to generate the damper command signals depending on which is larger.

3. The system according to claim 1 wherein the closed-loop controller uses predetermined different gain signal depending on the magnitude of the roll stability indicator signal.

4. The system according to claim 1 further comprising an open-loop controller, said open-loop controller calculating an open-loop roll control factor based on the lateral acceleration signal, said system further comprising an adder that adds the open-loop roll control factor and the closed-loop roll control factor to generate a total roll control factor to determine the suspension command signals for each damper.

5. The system according to claim 4 wherein the closed-loop controller determines the suspension command signals as:

$$K_{LF}=0.5K_T FR$$

$$K_{RF}=K_{LF}$$

$$K_{LR}=0.5K_T(1-FR)$$

$$K_{RR}=K_{LR}$$

where $K_{LF}$ is the damping command signal for the damper at the left front wheel, $K_{RF}$ is the damping command signal for the damper at the right front wheel, $K_{LR}$ is the damping command signal for the damper at the left rear wheel, $K_{RR}$ is the damping command signal for the damper at the right rear wheel, $K_T$ is the added open-loop and closed-loop roll control factor or the yaw stability control factor, and FR is the front to rear damper distribution.

6. The system according to claim 1 wherein the dampers are semi-active magneto-rheological dampers.

7. The system according to claim 1 wherein the closed-loop controller determines the front to rear damper distribution of the damping characteristics of the suspension dampers using look-up tables.

* * * * *